United States Patent [19]

Terada

[11] Patent Number: 4,986,100
[45] Date of Patent: Jan. 22, 1991

[54] KEY USING A SYNTHETIC RESIN BOW

[76] Inventor: Masaji Terada, 2-2-403, Atago 2 chome, Kokurakita-ku, Kitakyushu-shi, Japan

[21] Appl. No.: 442,816

[22] Filed: Nov. 29, 1989

[30] Foreign Application Priority Data

May 15, 1989 [JP] Japan .................. 1-156062[U]

[51] Int. Cl.⁵ .............................................. E05B 19/00
[52] U.S. Cl. ........................................ 70/395; 70/408
[58] Field of Search ............... 70/408, 395, 393, 402, 70/405, 406

[56] References Cited

U.S. PATENT DOCUMENTS

| | | | |
|---|---|---|---|
| 2,653,492 | 9/1953 | Abrams | 70/408 |
| 3,427,833 | 1/1967 | Lempke | 70/408 |
| 3,526,112 | 9/1970 | Herrington | 70/395 |
| 3,786,659 | 1/1974 | Elder | 70/408 |

FOREIGN PATENT DOCUMENTS

| | | |
|---|---|---|
| 47-32695 | 12/1972 | Japan . |
| 466785 | 8/1977 | Japan . |
| 511296 | 5/1979 | Japan . |
| 582543 | 5/1982 | Japan . |

Primary Examiner—Robert L. Wolfe
Attorney, Agent, or Firm—Armstrong, Nikaido, Marmelstein, Kubovcik & Murray

[57] ABSTRACT

A key using a synthetic resin bow which is connected to a metal key body having a blade section to which serrations are to be formed for use and an inserting section which is thinner than the blade section; the bow is formed into the thickness within 0.9 to 1.3 times that of the blade section.

2 Claims, 2 Drawing Sheets

KEY USING A SYNTHETIC RESIN BOW

BACKGROUND OF THE INVENTION

This invention relates to a key using a synthetic resin (including synthetic rubber) bow.

Recently, many keys using a synthetic resin bow have been widely used because various colors of synthetic resins can be used.

In the case of conventional key using a synthetic resin bow consisting of a key body having a blade section on the side of which serrations are to be formed and a bow which is to be connected to the inserting section which is the tang of said key body, the thickness of the bow is 2 to 4 times that of the blade section.

That is because it is necessary to form the bow with a certain thickness to warp the inserting section of the key body when using a synthetic resin bow.

Accordingly, when a plural number of keys of that type are held with a key holder, etc., there has been a problem that the bow sections become bulky.

There has been another problem that even a single key of that type is difficult to put into a wallet, etc. because of its thickness.

SUMMARY OF THE INVENTION

The present invention has been made inview of the above-said circumstances and accordingly it is an object of this invention to provide a key using synthetic resin at least for the surface of its bow, which is thin and not bulky.

The key using a synthetic resin bow relating to the invention with the object mentioned above comprises a metal key body including a blade section on which serrations are to be formed for use and an inserting section which is thinner than and connected to said blade section, and a synthetic resin bow which is fixed to the inserting section of said key body and whose thickness is within 0.9 to 1.3 times that of said blade section.

Here, the synthetic resin includes synthetic rubber, and the invention is appliable to a key whose bow is made of synthetic resin with plural colors as well as monocolor resins.

The key using a synthetic resin bow relating to the invention can be handled as same as a thin metal key, and a plural number of said keys comprising synthetic resin bow don't become bulky when they are held with a key holder, and a single key of that type can be put into a wallet, etc. without making them bulky because the thickness of the bow is within 0.9 to 1.3 times that of the blade section.

Furthermore, the strength of the bow is sufficient for ordinary use because the thinner metal inserting section of the key body is inserted into the bow.

And, by making the thickness of the bow nearly the same as that of the blade section, the key of this type can be used just like a conventional one. Here, 'nearly the same' means the range of thickness that does not give a feeling of unevenness in use at the boundary of both sections.

BRIEF DESCRIPTIN OF THE DRAWINGS

DESCRIPTION OF PREFERRED EMBODIMENT

Figure 1:
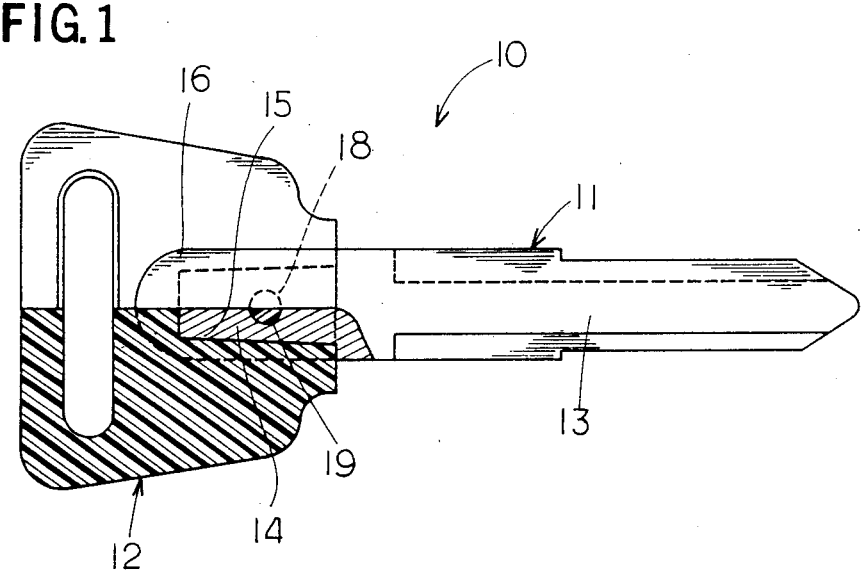
FIG. 1 is a plan view of the key using a synthetic resin bow relating to the first embodiment of the invention.
Figure 2:
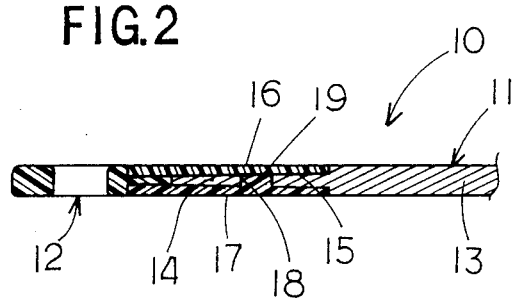
FIG. 2 is a partial sectional view of the same.

As shown in FIGS. 1 and 2, the key 10 using a synthetic resin bow relating to the first embodiment of the invention comprises a key body 11 made of metallic material (such as brass, iron, stainless steel) and a bow 12 which is connected to said key body 11.

The above-mentioned key body 11 consists of a blade section 13 on which serrations are to be formed and an inserting section 14 which is integrated into above-mentioned bow 12, and the thickness of said blade section 13 is 1.8 to 3.5 mm, and the thickness of the inserting section which is fixed to the bow 12 is nearly 60 to 80% that of blade section (1.1 to 2.8 mm), making a gradually-tapered inserting section.

The above-mentioned bow 12 is made of polyether imide resin, polycarbonate resin, polyether sulfone resin, polybutylene terephthalate resin, polyphenylene sulfide resin, polysulfone resin, polyethylene terephtalate resin, polyacetal resin, polyamide resin, polypropylene resin, polymethylmethacrylate, metameric PPE resin, ABS resin, AS resin, composite of glass fiber and above-said synthetic resin, natural rubber, or synthetic rubber each of which is one of the examples of synthetic resins, wherein there is provided a cut-off section 15 having a same plan view in shape as that of the inserting section 14 at the portion of the bow to which the inserting section 14 is connected and, after the inserting section 14 is fit tightly to said cut-off section 15, said section is covered with synthetic resin caps 16 and 17 from top and bottom, and then bonded by use of adhesives or by ultrasonic heating.

To prevent the inserting section 14 of the key body from coming off from the bow 15, there is provided a mortise 18 through the inserting section 14, and a cylindrical tenon 19 which is formed on either or both of the caps 16 and 17 is inserting into the mortise 18. And said tenon 19 is bonded to the cap or the tenon of the other side by thermal bonding or with adhesives.

In addition, it is possible to employ an inserting section that has an endwise expansion, to form an expansion in the middle of the cut-off section in the bow, and to cover said sections with caps from top and bottom after inserting the inserting section of the key body from the top of the bow.

Though the width of inserting section 14 is narrower than that of blade section 13 in the above-mentioned embodiment, it is possible to make the width of blade section 13 the same as that of the inserting section 14, and the invention is also applicable to the case where the width of the inserting section 14 is made wider than that of the blade section 13 by press forming, etc. for example (the same is applicable to the following embodiment). In such case, the width of the upper cap is made wider than that of the blade section.

Figure 3:
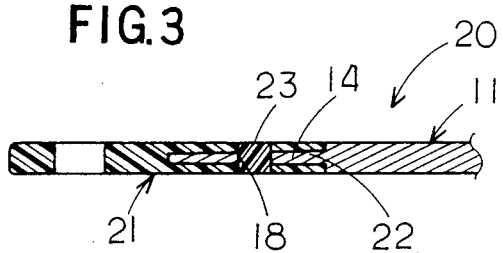
FIG. 3 is a partial sectional view of the key using a synthetic resin bow relating to the second embodiment of the invention.

In the case of a key 20 as shown in FIG. 3 using a synthetic resin bow relating to the second embodiment, there is provided an opening 22 for receiving the inserting section 14 of the key body in the bow 21 as shown in the figure, and the key body 11 is connected to the bow 21 in such manner that said inserting section 14 is inserted into the opening 22 and bonded there by thermal bonding or with adhesives, and a separate cylindrical lock pin 23 made of synthetic resin is inserted into and bonded at the mortise 18 provided through the inserting section 14.

In the above-mentioned embodiment, by using the synthetic resin of a color different from that of the bow 12 or 21 for the caps 16 and 17, or the lock pin 23, it is possible to improve the appearance of the key 10 or 20 using a synthetic resin bow more fashionable and it further becomes easy to classify the keys on use.

Figure 4:
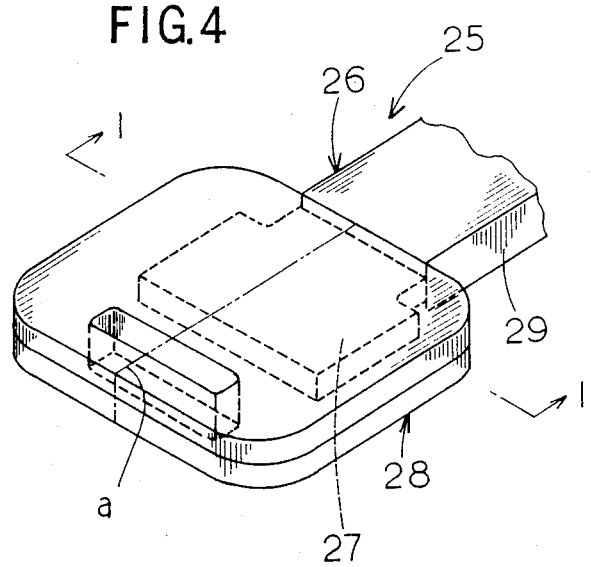
FIG. 4 is a partial perspective view of the key using a synthetic resin bow relating to the third embodiment of the invention.
Figure 5:
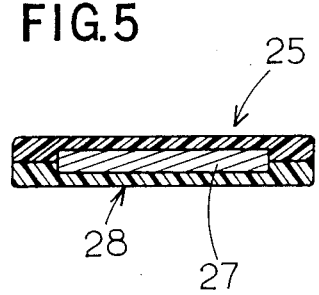
FIG. 5 is a sectional view in the direction of arrow 1—1 in FIG. 4.

Then, in the case of a key 25 using a synthetic resin bow relating to the third embodiment of the invention shown in FIGS. 4 and 5, the portion where the metallic inserting section 27 of the key body 26 is jointed to the bow 28 is thinner than that of the blade section 29, and the bow 28 to which the inserting section is connected is divided into upper and lower two halves between which said inserting section 27 is put and bonded with adhesives or by thermal bonding.

In this case, the material of the bow 28 is the same as that of the above-mentioned bow 12, and the thickness of the bow, with upper and lower halves being bonded, is nearly the same as that of the blade section 29.

Though the bow 28 is divided into upper and lower halves in the above-mentioned embodiment, it is possible to divide the bow into right and left halves as shown in FIG. 4 by the two-dot chain line 'a' and, in such a case, it becomes possible to produce keys having various color combinations by using different colors for the right and left bow halves.

Through the key is produced by bonding the bow to the key body in above-said embodiment, it is possible to produce the key by monobloc forming (double-color forming, for example) by setting only the inserting section into a bow mold which is jointed tightly to the mold for key body and, in such a case, it is preferably the inserting section has a shape such that its top section is wider than the incoming section of the opening of the bow 28, just like the inserting section 27 shown in FIG. 4, so as to prevent the key body from coming off.

In the above-mentioned embodiment, it is further possible to employ a strong metal (such as steel and stainless steel) only for the inserting section and wlld it to the blade section to which serrations are to be formed.

Though the above-mentioned embodiment covers a key having a key body whose thickness is nearly the same as that of bow, this invention is applicable to the key having a bow whose thickness is within 0.9 to 1.3 times that of key body.

What is claimed is:

1. A key having a synthetic resin bow, comprising:
    a metal key body comprising a blade section on which serrations are to be formed and an inserting section connected to said blade section, wherein said inserting section is thinner than said blade section, and
    wherein said synthetic resin bow is non-monably fixed to and completely surrounds the inserting of said key body and has a a thichness within 0.9 and 1.3 times that of said blade section.
2. A key having a synthetic resin bow as set forth in claim 1, wherein the thickness of the bow is nearly the same as that of the blade section.

* * * * *